United States Patent
Guglietti et al.

(10) Patent No.: US 9,062,748 B1
(45) Date of Patent: Jun. 23, 2015

(54) BALL SCREW NUT

(76) Inventors: David B. Guglietti, Sterling Heights, MI (US); Richard A. Kleiner, Algonac, MI (US)

(*) Notice: Subject to any disclaimer, the term of this patent is extended or adjusted under 35 U.S.C. 154(b) by 235 days.

(21) Appl. No.: 12/924,503

(22) Filed: Sep. 28, 2010

Related U.S. Application Data (60) Provisional application No. 61/277,799, filed on Sep. 30, 2009.

(51) Int. Cl.
  *F16H 1/24* (2006.01)
  *F16H 55/02* (2006.01)
  *F16H 25/22* (2006.01)

(52) U.S. Cl.
  CPC ........ *F16H 25/2214* (2013.01); *F16H 25/2223* (2013.01); *Y10T 74/19772* (2015.01)

(58) Field of Classification Search
  CPC ............ F16H 25/2214; F16H 25/2219; F16H 25/2223; F16H 25/2204
  USPC .......................................... 74/424.81–424.87
  See application file for complete search history.

(56) References Cited

U.S. PATENT DOCUMENTS

| | | | |
|---|---|---|---|
| 477,642 A | 6/1892 | Brunthaver | |
| 611,832 A | 10/1898 | Coughlan | |
| 1,704,031 A | 4/1927 | Boehm | |
| 2,380,662 A | 7/1945 | Means | |
| 3,053,105 A | 9/1962 | Cole | |
| 3,059,494 A | 10/1962 | Grabowski et al. | 74/441 |
| 3,124,969 A | 3/1964 | Grabowski et al. | 74/441 |
| 3,498,651 A | 3/1970 | Peterson | 403/355 |
| 4,008,625 A | 2/1977 | Malhotra | 74/441 |
| 4,487,087 A | 12/1984 | Johnstone | 74/424.8 |
| 4,638,548 A | 1/1987 | Miller | |
| 4,643,041 A | 2/1987 | Benton | 74/441 |
| 4,669,324 A | 6/1987 | deMey et al. | 74/89.23 |
| 4,760,635 A | 8/1988 | Miller | |
| 4,827,789 A | 5/1989 | Hallidy et al. | 74/89.27 |
| 4,953,419 A | 9/1990 | Schlenker | |
| 5,063,809 A | 11/1991 | Schlenker | |
| 5,193,409 A | 3/1993 | Babinski | 74/424.83 |
| 5,373,755 A * | 12/1994 | Rohlinger | 74/424.86 |
| 5,467,661 A | 11/1995 | Lange | 74/441 |
| 5,493,929 A | 2/1996 | Namimatsu et al. | |
| 5,501,118 A | 3/1996 | Benton | 74/441 |
| 5,582,072 A | 12/1996 | Yamaguchi et al. | 74/441 |
| 5,653,145 A | 8/1997 | Kobayashi et al. | |
| 5,697,252 A | 12/1997 | Yamaguchi et al. | 74/441 |

(Continued)

OTHER PUBLICATIONS

Guglietti, U.S. Appl. No. 13/136,598, filed Aug. 4, 2011 A.D.

(Continued)

*Primary Examiner* — William Kelleher
*Assistant Examiner* — Jake Cook
(74) *Attorney, Agent, or Firm* — Christopher John Rudy (57) ABSTRACT

Ball screw nut includes first and second ball bearing accommodating inserts that can be part of a ball bearing return system in the nut with the first and/or second inserts having a body with a passage for ball bearings, which opens in a first direction; and a depending foot having a heel and toe, which joins the body and which has below the body in the toe of the foot for the ball bearings a channel that faces in a second direction substantially perpendicular to the first direction and that can communicate ball bearings with the passage in the body to or from a spiral raceway of the nut and an associated ball screw shaft.

12 Claims, 12 Drawing Sheets

(56) References Cited

U.S. PATENT DOCUMENTS

| | | |
|---|---|---|
| 5,791,192 A | 8/1998 | Lee |
| 5,911,789 A | 6/1999 | Keipert et al. ............. 74/493 |
| 6,082,209 A | 7/2000 | Yabe et al. ............. 74/424.83 |
| 6,142,032 A | 11/2000 | Creager ............. 74/441 |
| 6,176,149 B1 | 1/2001 | Misu |
| 6,425,302 B2 * | 7/2002 | Greubel ............. 74/424.87 |
| 6,446,520 B1 | 9/2002 | Nagai et al. |
| 6,928,895 B2 | 8/2005 | Davies et al. ............. 74/89.26 |
| 7,337,688 B2 | 3/2008 | Husistein ............. 74/89.42 |
| 7,363,835 B2 * | 4/2008 | Ohkubo et al. ............. 74/424.86 |
| 7,506,557 B2 | 3/2009 | Hosokai et al. ............. 74/89.42 |
| 7,516,681 B2 | 4/2009 | Hsu |
| 7,520,193 B2 * | 4/2009 | Chen ............. 74/424.87 |
| 7,523,681 B2 * | 4/2009 | Pan et al. ............. 74/424.82 |
| 7,523,682 B2 | 4/2009 | Liao et al. |
| 7,562,596 B2 | 7/2009 | Chen ............. 74/89.42 |
| 2002/0026844 A1 * | 3/2002 | Fujita ............. 74/424.86 |
| 2003/0172759 A1 * | 9/2003 | Hayashi ............. 74/424.86 |
| 2004/0000208 A1 * | 1/2004 | Michioka et al. ............. 74/424.86 |
| 2006/0137485 A1 | 6/2006 | Ohkubo |
| 2007/0186708 A1 | 8/2007 | Liao et al. |
| 2008/0053260 A1 * | 3/2008 | Liao et al. ............. 74/424.87 |
| 2008/0134822 A1 * | 6/2008 | Pan et al. ............. 74/424.87 |
| 2008/0190231 A1 * | 8/2008 | Chiu et al. ............. 74/424.86 |
| 2009/0013811 A1 * | 1/2009 | Hsu ............. 74/424.87 |
| 2009/0107273 A1 * | 4/2009 | Chen et al. ............. 74/424.86 |
| 2009/0158873 A1 * | 6/2009 | Wu et al. ............. 74/424.86 |

OTHER PUBLICATIONS

Guglietti, U.S. Appl. No. 61/400,979, filed Aug. 5, 2010 A.D.
Guglietti et al., U.S. Appl. No. 61/277,799, filed Sep. 30, 2009 A.D.

* cited by examiner

BALL SCREW NUT

This claims benefits under 35 USC 119(e) of U.S. provisional patent application No. 61/277,799 filed on Sep. 30, 2010 A.D. The specification of that application, of course to include its drawings, is incorporated herein by reference.

FIELD OF THE INVENTION

This concerns a nut for a ball screw, and machinery with the the same. Parts made with such machinery are of concern as well.

BACKGROUND TO THE INVENTION

Various types of ball screw nuts are known. Among types of such nuts in addition to tube ball-return types may be mentioned 20th Century, Flopover, Starr, Cincinnati, and Jena-Tec models. Among drawbacks to such nuts can be their high unit cost, high installation cost, lack of adaptability to various ball screws or machinery therewith, quick rate of wearing out and/or practical inability or economic unviability to repair some models. Compare the following patents or patent application publications:
Brunthaver, U.S. Pat. No. 477,642 (Jun. 28, 1892);
Coughlan, U.S. Pat. No. 611,832 (Oct. 4, 1898);
Boehm, U.S. Pat. No. 1,704,031 (Apr. 11, 1927);
Means, Jr., U.S. Pat. No. 2,380,662 (Jul. 31, 1945);
Cole, U.S. Pat. No. 3,053,105 (Sep. 11, 1962);
Miller, U.S. Pat. No. 4,638,548 (Jan. 27, 1987);
Miller, U.S. Pat. No. 4,760,635 (Aug. 2, 1988);
Schlenker, U.S. Pat. No. 4,953,419 (Sep. 4, 1990);
Schlenker, U.S. Pat. No. 5,063,809 (Nov. 12, 1991);
Namimatsu et al., U.S. Pat. No. 5,493,929 (Feb. 27, 1996);
Kobayashi et al., U.S. Pat. No. 5,653,145 (Aug. 5, 1997);
Lee, U.S. Pat. No. 5,791,192 (Aug. 11, 1998);
Misu, U.S. Pat. No. 6,176,149 B1 (Jan. 23, 2001);
Greubel, U.S. Pat. No. 6,425,302 B2 (Jul. 30, 2002);
Nagai et al., U.S. Pat. No. 6,446,520 B1 (Sep. 10, 2002);
Ohkubo, Pub. No. US 2006/0137485 A1 (Jun. 29, 2006);
Liao et al., Pub. No. US 2007/0186708 A1 (Aug. 16, 2007);
Hsu, U.S. Pat. No. 7,516,681 B2 (Apr. 14, 2009);
Chen, U.S. Pat. No. 7,520,193 B2 (Apr. 21, 2009);
Pan et al., U.S. Pat. No. 7,523,681 B2 (Apr. 28, 2009); and
Liao et al., U.S. Pat. No. 7,523,682 B2 (Apr. 28, 2009).
Of the patents or patent application publications, Chen, and Lee, Misu, Greubel and Pan et al. may be of greater possible interest.

It would be desirable to ameliorate if not solve one or more of such drawbacks. It would be desirable to provide the art with an alternative.

A FULL DISCLOSURE OF THE INVENTION

Provided hereby is a ball screw nut comprising a housing having an internal passage along an axis for receiving a ball screw shaft with an external, spiral raceway that is adapted to receive a set of ball bearings; at least one internal, spiral raceway in the internal passage of the housing adapted to receive and contain the set of ball bearings in conjunction with the external, spiral raceway of the ball screw shaft; and, for at least one of the at least one internal, spiral raceway:
a first opening at a first position in the raceway through the housing, adapted to receive a first ball bearing accommodating insert; and
a second opening at a second position in the raceway spaced apart from the first position in the raceway through the housing, adapted to receive a second ball bearing accommodating insert;
wherein the first and second ball bearing accommodating inserts are part of a ball bearing return system that cycles ball bearings from the set of ball bearings external to the internal passage of the housing, and at least one of the first and second ball bearing accommodating inserts embraces:
a body with a passage for the ball bearings, which opens in a first direction; and
a depending foot having a heel and toe, which joins the body and which has below the body in the toe of the foot for the ball bearings a channel that faces in a second direction substantially perpendicular to the first direction when viewed from a top position and that can communicate ball bearings with the passage in the body to or from the at least one internal, spiral raceway in the internal passage of the housing adapted to receive and contain the set of ball bearings in conjunction with the external, spiral raceway of the ball screw shaft.

The present ball screw nut can be combined with the ball screw shaft and set of ball bearings to provide a ball screw. The ball screw may be incorporated into machinery. Such machinery may be such that parts can be made therewith, say, from stock.

Significantly, by the invention, at least one drawback in the art is ameliorated if not solved, and the art is provided with alternatives. More particularly, the present ball screw nut can have a lower unit cost than known ball screw nuts; it can be easy to install and be highly adaptable to various ball screws and machinery therewith, with a lower machinery installation cost than with known ball screw nuts; it can have a long service life; and it can be repaired practically and economically. The number of parts is reduced compared to competing devices.

Numerous further advantages attend the invention.

The drawings form part of the specification hereof. With respect to the drawings, which are not necessarily drawn to scale, the following is briefly noted.

The invention can be further understood by the detail set forth below, which may be read in view of the drawings. The same, as with the foregoing disclosure, is to be taken in an illustrative and not necessarily limiting sense.

The present ball screw nut embraces a housing having an internal passage along an axis for receiving a ball screw shaft. The axis is central with respect to the internal passage, and as such is that about which the spiral raceways wind. There may be one internal, spiral raceway or more than one such raceway per ball screw nut. For at least one of the at least one internal, spiral raceway, or for more than one of them, up to all of them, there are provided first and second spaced apart openings in the housing, each of which can receive a ball bearing accommodating insert. Thus, there can be one pair of spaced apart openings for a one-raceway ball screw nut, two pairs of spaced apart openings for a two-raceway ball screw nut, three pairs . . . and so forth. The pair of ball bearing accommodating inserts is part of a ball bearing return system for a particular spiral raceway, which cycles ball bearings from the set of ball bearings external to the internal passage of the housing. The present ball screw nut requires that one of a pair or both of a pair of the ball bearing accommodating inserts per spiral raceway of the ball screw nut have an insert that embraces:

a body with a passage for the ball bearings, which opens in a first direction; and a depending foot having a heel and toe, which joins the body and which has below the body in the toe of the foot for the ball bearings a channel that faces in a second direction substantially perpendicular to the first direction when viewed from a top position and that can communicate ball bearings with the passage in the body to or from the at least one internal, spiral raceway in the internal passage of the housing adapted to receive and contain the set of ball bearings in conjunction with the external, spiral raceway of the ball screw shaft.

The housing can be of one piece, and the insert can be of one piece. An angled channel in the housing can be provided for pickup and/or dropoff of ball bearings in the spiral raceway in conjunction with the insert. A ball bearing accommodating insert communication relay, say, a tube, can be provided to connect a pair of spaced apart inserts for ball bearing communication between the inserts external the internal passage of the housing. If the pair of inserts is not spaced very widely apart, say, where the inserts touch to have their openings in their first directions communicate directly with one another, a separate insert communication relay between the inserts may be absent.

Any suitable material may be employed. A suitable metal, ceramic and/or plastic may be employed. For example, the ball screw nut housing and the insert can be of hardened steel.

Any suitable method or process of manufacture can be employed. Accordingly, machining of suitable stock can be employed to make the ball screw nut and insert. Casting can also be employed, for instance, to make a nut or an insert.

Ball bearing communication between a pair of inserts may be parallel to the central axis of the housing. This can provide for a minimal amount of material external the nut, which can make for increased ease of incorporating the same in machinery of various sorts. There may be one, two or more pairs of inserts per ball screw nut. When there is a plurality of pairs of inserts per nut, the pairs may have communication between inserts of each pair generally along the same line parallel to the central axis of the nut in, say, a first pair then second pair relationship, i.e., in-line pairs. There may be staggered pairs of inserts where the pairs have communication along separate lines, each of which also may be parallel to the central axis.

Finished inserts can be modified by machining to accommodate various pitches and diameters of ball screw nuts. The foot of the insert, with its abundant reserve and strengthening material, helps provides for this. A long service life can be maintained.

Components may have any suitable size, configuration or arrangement. For instance, the present ball screw nut may have a relatively low profile as depicted or be machined with an even lower profile than depicted. The ball screw nut may have a collar or be collarless, and so forth. The present insert may have a generally circular body when viewed from the top and be generally cylindrical or even conical with respect thereto, have a generally elliptical or ovoid body viewed from the top, or have one or more truncations to a generally circular, elliptical or ovoid body, or be polygonal when viewed from the top, again with generally upright or slanted sides akin to those mentioned for the generally circular body. The body of the present insert may have a convexo-concave shape when viewed from the top, and so forth. The insert may fit in the housing in close registry to a corresponding opening. An interference fit may be provided. Fastening with a fastener, for instance, a rod, wedge or screw and so forth and the like, at any suitable location with respect to the insert and housing may secure the insert to the housing.

A resin or filler may be employed to provide a smooth outer contour to an assembled ball screw nut especially to esthetically fill external concavities. A resin and/or filler can be absent.

A product may be made with the ball screw nut combined with a corresponding ball screw shaft and ball bearings to make a ball screw. The ball screw may be combined with another machine.

With more particular respect to the drawings, ball screw nut 100 is set up about central axis 6 and can receive ball screw shaft 7 having external, spiral raceway 8 adapted to receive ball bearings 9. The nut 100 includes housing 10 having internal passage 11 along the axis 6. Internal, spiral raceway 12 is provided in the internal passage 11 of the housing 10 and is adapted to receive and contain the ball bearings 9 in conjunction with the external, spiral raceway 8 of the ball screw shaft 7 when the shaft 7 and ball bearings 9 are assembled with the housing 10. Each internal spiral raceway 12 has communication to outside the internal passage 11 through the housing 10 with two openings 13, 14, each of which may be generally in an old fashioned skeleton keyhole shape when viewed from the top, and may include surrounding insert seat 15 and optional tapped insert securing hole 15H, for example, for receiving a securing screw to secure or help secure an insert 20. There may be inter-opening channel 16 between spaced apart seats 15. Ball bearing pickup/dropoff upper surface 17 has a suitable angle not parallel with a radius originating from the axis 6, say, about a 40-degree angle, to provide part of a passage for the ball bearings 9. Collar 18 may be present. One or both of the openings 13, 14 is adapted to receive and accommodate one insert 20 per opening.

The insert 20 includes body 21 with passage 22 for the ball bearings 9, which opens in a first direction, say, along a line parallel to the central axis 6 and external the internal passage 11 of the housing 10 when the insert 20 is inserted in the housing 10. Passage inter-insert communication member resting inner shoulder 23 may be provided. Depending from and joined to the body 21 there is foot 24, which has heel 25 and toe 26 portions. In the toe 26 is provided channel 27 for the ball bearings 9, which faces in a second direction substantially perpendicular to the first direction when viewed from a top position and which can communicate the ball bearings 9 from or to the passage 22 in the body 21 of the insert 20, to or from the at least one internal, spiral raceway 12 in the internal passage 11 of the housing 10, which is adapted to receive and contain the ball bearings 9 in conjunction with the external, spiral raceway 8 of the ball screw shaft 7 when the shaft 7 and housing 10 are assembled together. The channel 27 corresponds with the ball bearing pickup/dropoff upper surface 17 when the insert 20 is assembled in the nut 100, say, including a lower surface substantially parallel with the angle of the pickup upper surface 17, so that an angled pickup or dropoff passage is provided for the ball bearings 9 when the insert is combined with the housing 10 of the nut 100. Orifice 28 can accommodate a securing screw for threading it into the hole 15H far securing the insert 20.

Insert communication relay 30 may span a pair of inserts 20.

Figure 1:
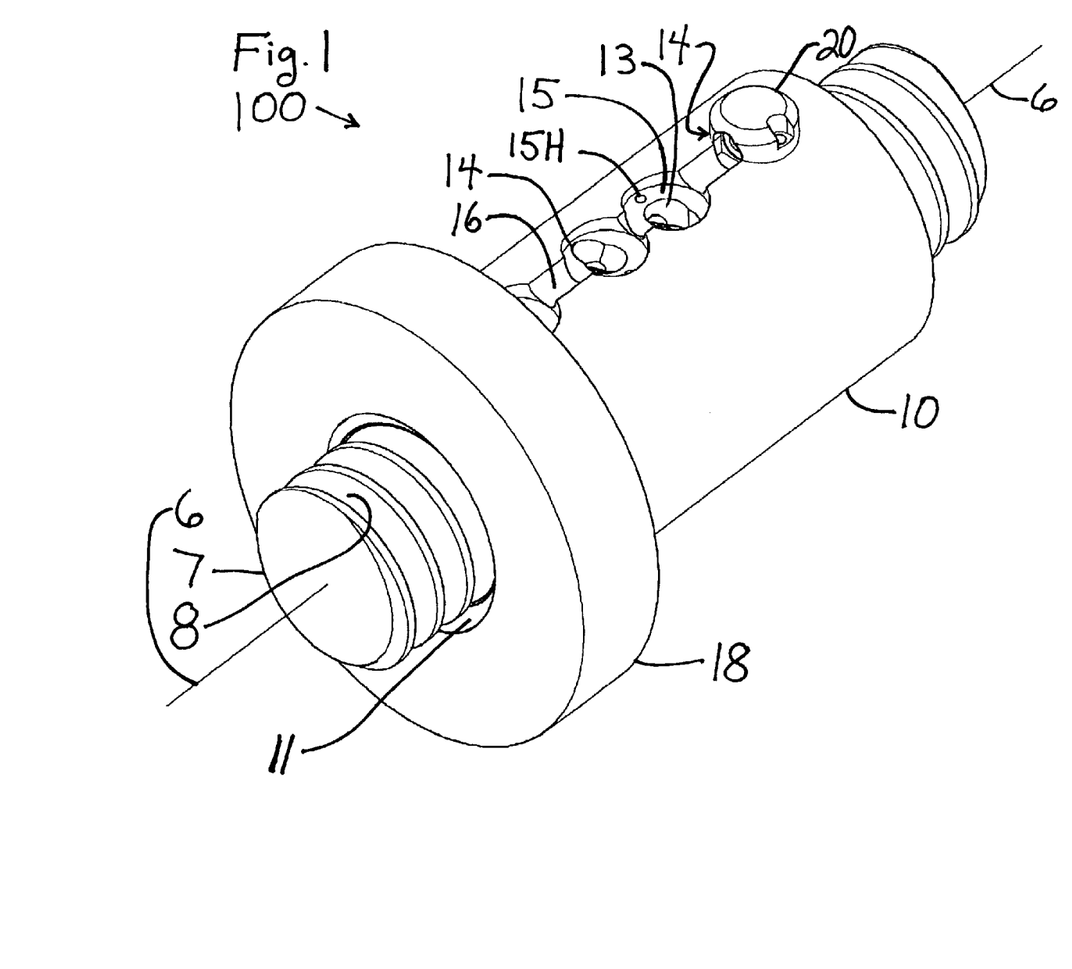
FIG. 1 is top perspective view of a ball screw nut hereof, partially assembled, into which a ball screw shaft is inserted.
Figure 2:
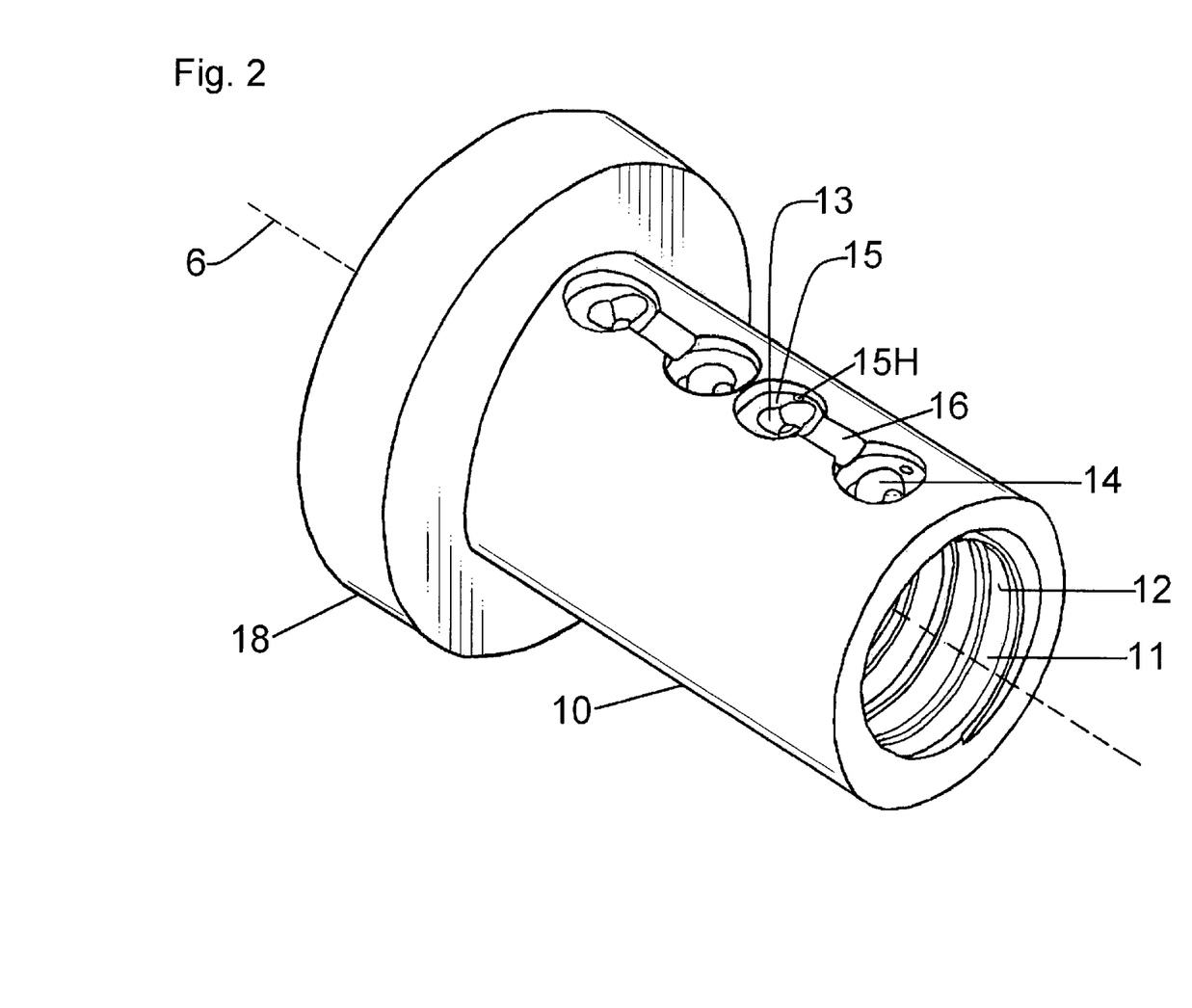
FIG. 2 is a top perspective view of the housing of the ball screw nut found in FIG. 1, i.e., with all inserts removed, plus with the ball screw shaft removed.
Figure 3:
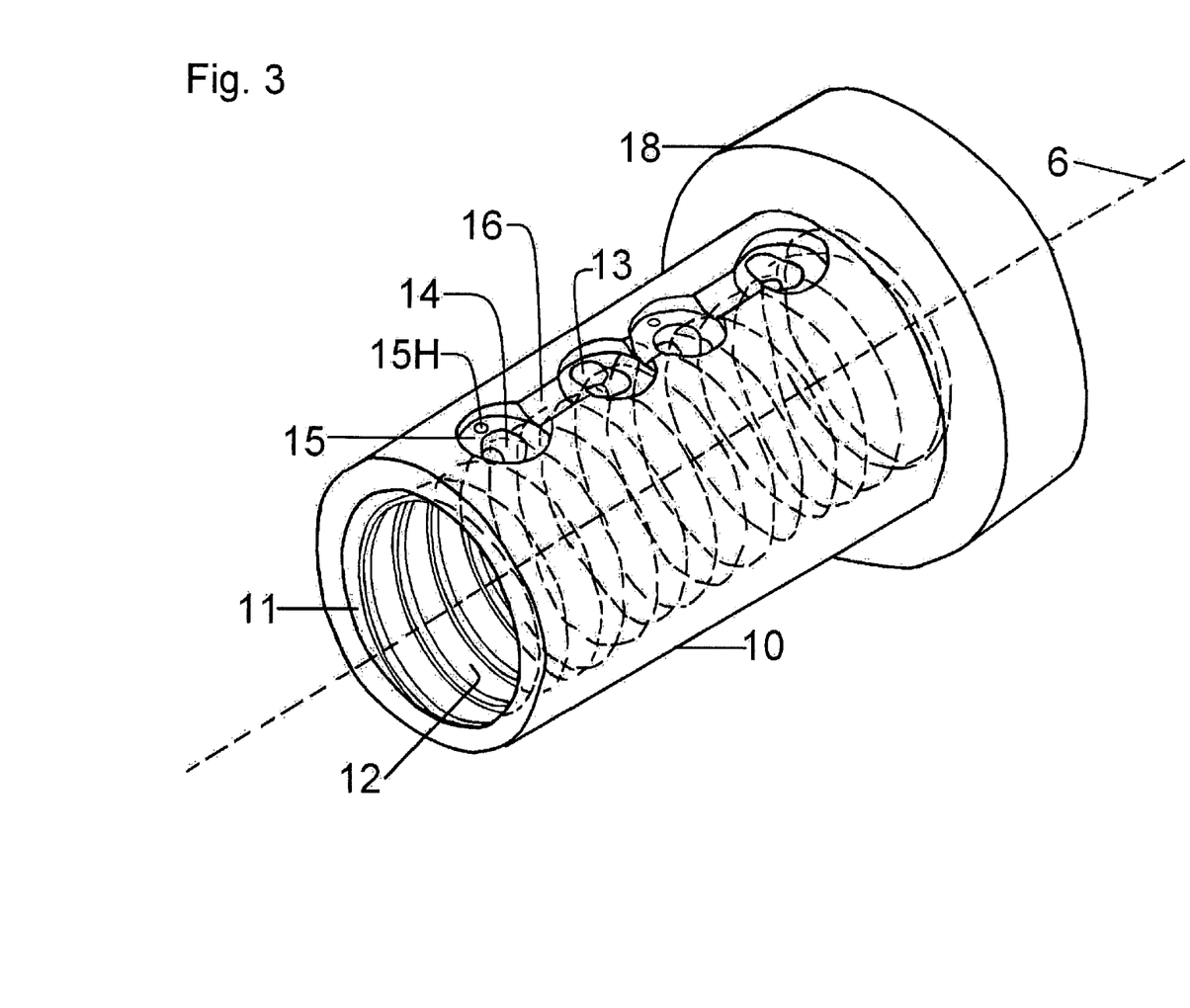
FIG. 3 is a top perspective plan view of the FIG. 2 housing.
Figure 4:
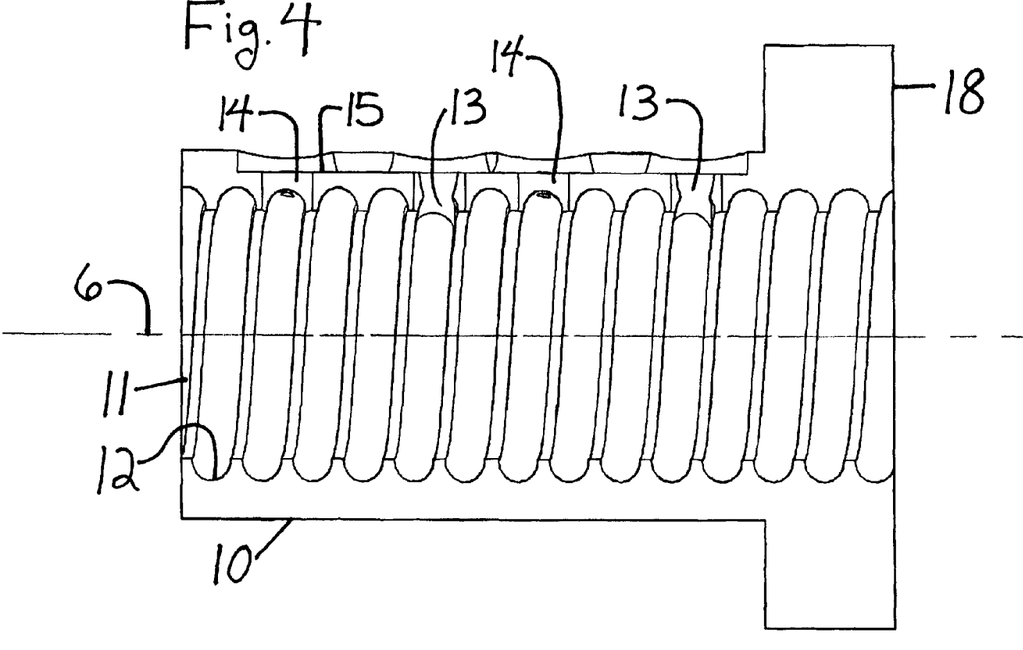
FIG. 4 is side sectional view of the housing of FIG. 2.
Figure 5:
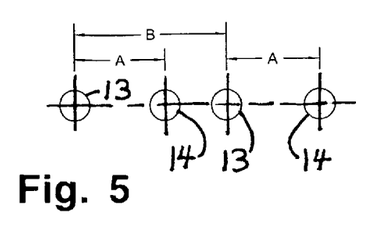
FIG. 5 is an illustration of a formula for a ball screw nut embodiment, which may be employed with a nut as in FIG. 2.
Figure 6:
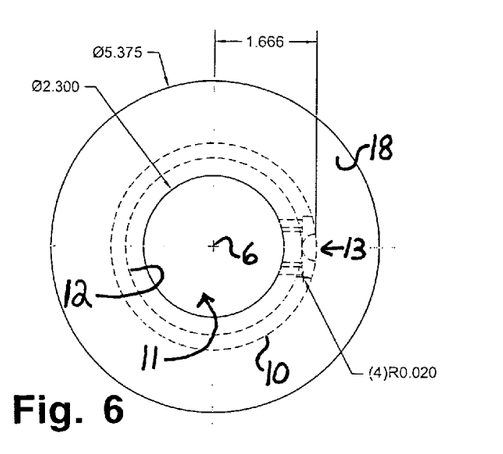
FIG. 6 is a rear plan view of an embodiment of a ball screw nut as of FIG. 2, which employs the formula of FIG. 5.
Figures 7, 8:
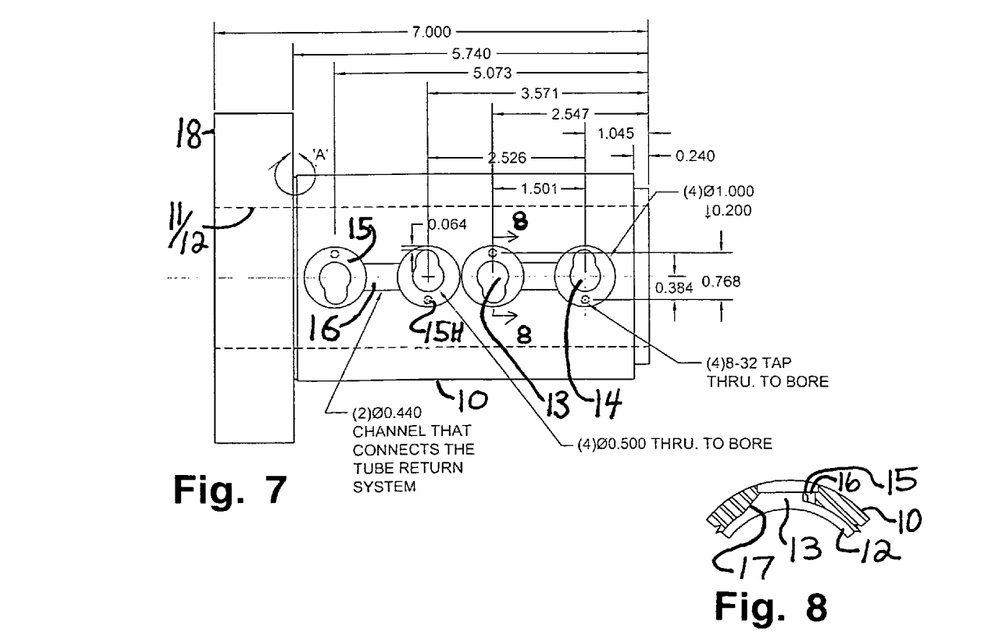
FIG. 7 is a top plan view of the nut of FIG. 6.
FIG. 8 is a section view of an insert receptacle found in the housing of the nut of FIG. 6, taken along 8-8 in FIG. 7.
Figure 9:
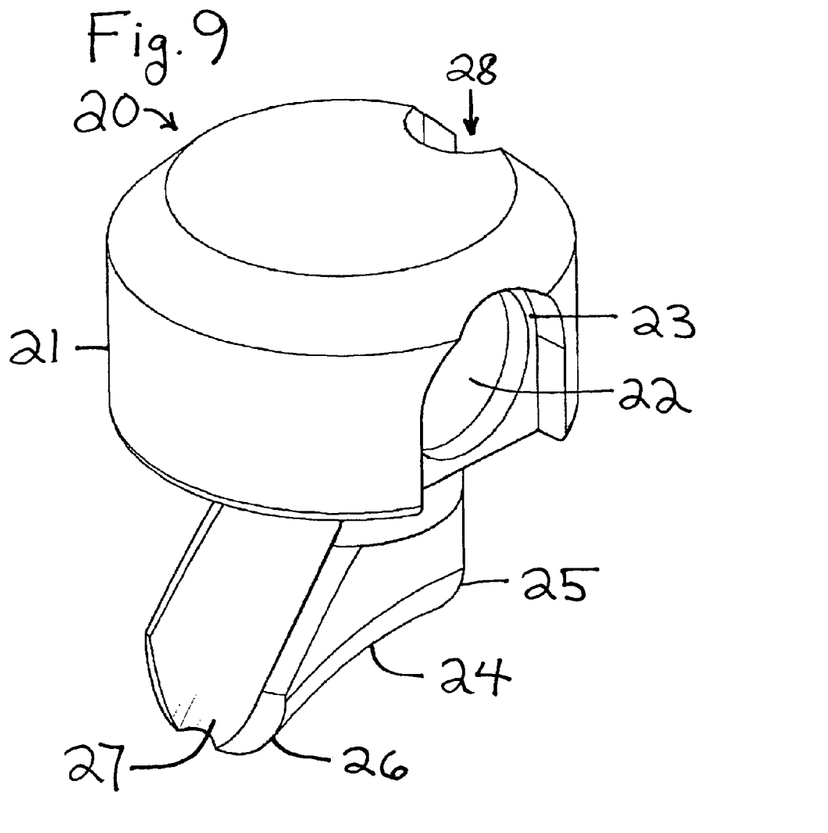
FIG. 9 is a top perspective view of an insert found in the ball screw nut of FIG. 1.
Figure 10:
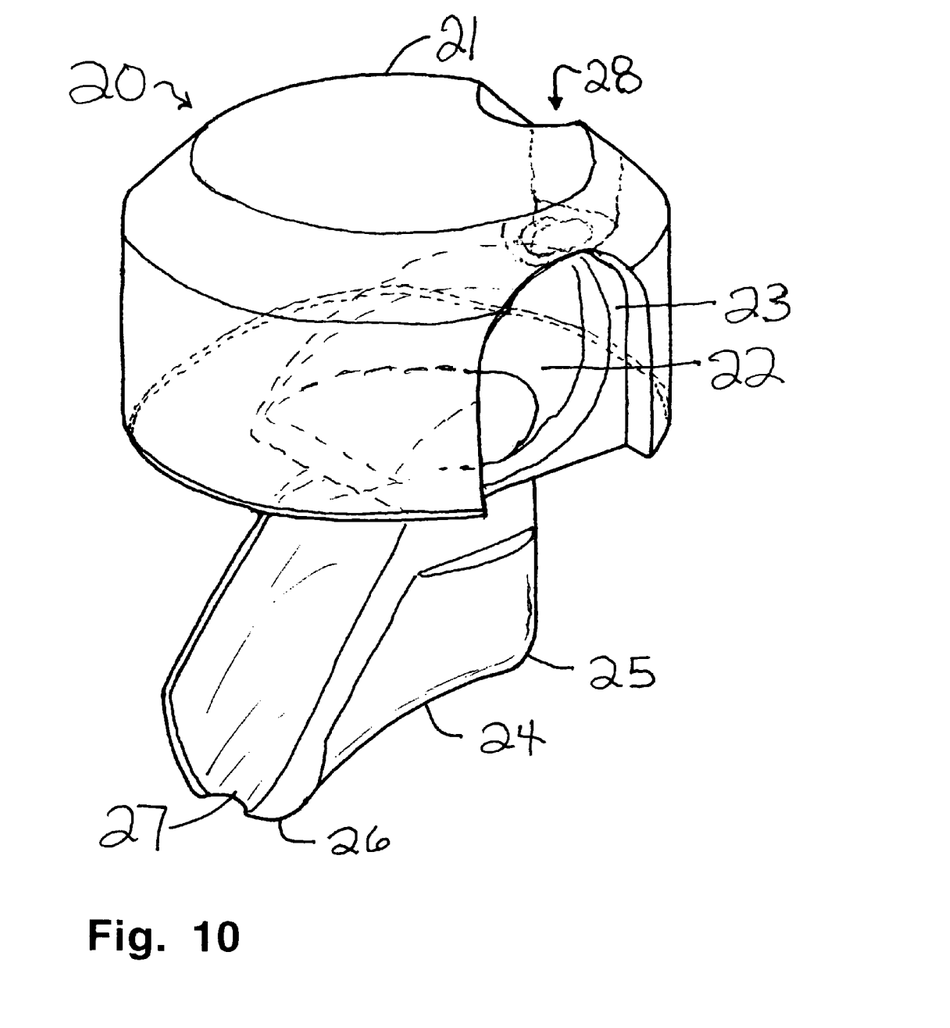
FIG. 10 is a top plan perspective of the insert of FIG. 9.
Figure 11:
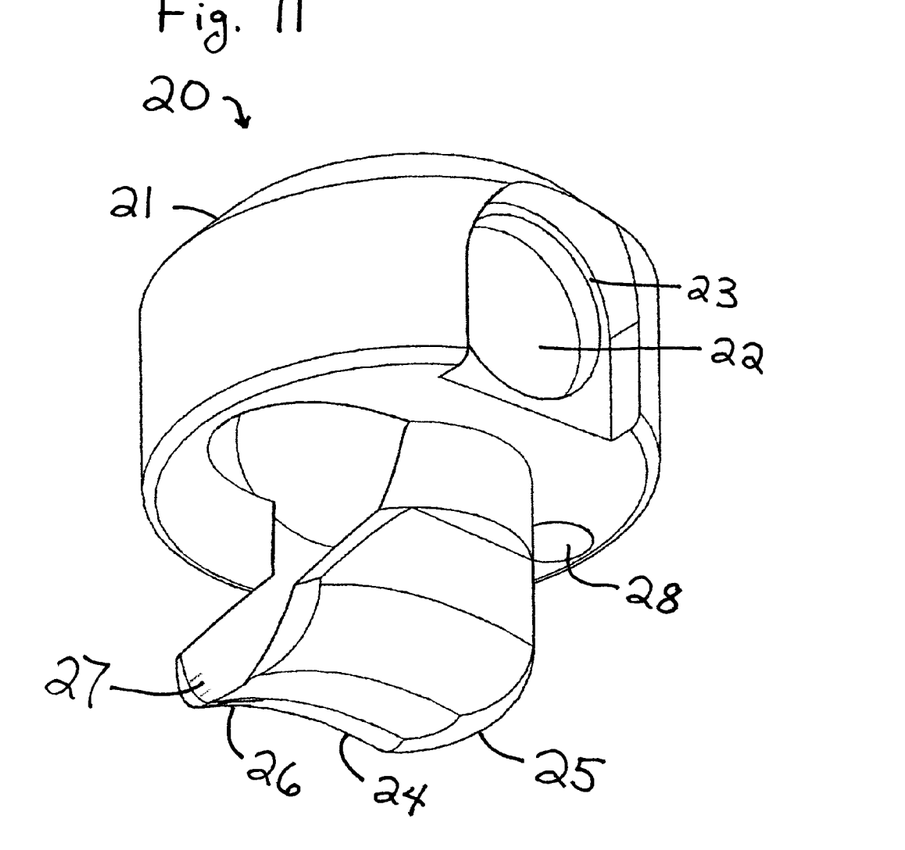
FIG. 11 is a bottom perspective view of the insert of FIG. 9.
Figure 12:
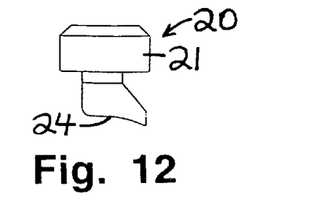
FIG. 12 is an elevational view of an embodiment of an insert as of FIG. 9.
Figure 13:
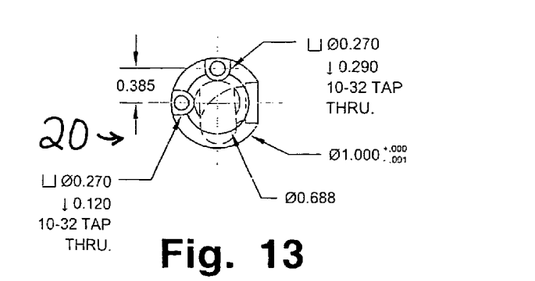
FIG. 13 is a top plan view of the insert of FIG. 12.
Figures 14, 15, 16, 17, 18:
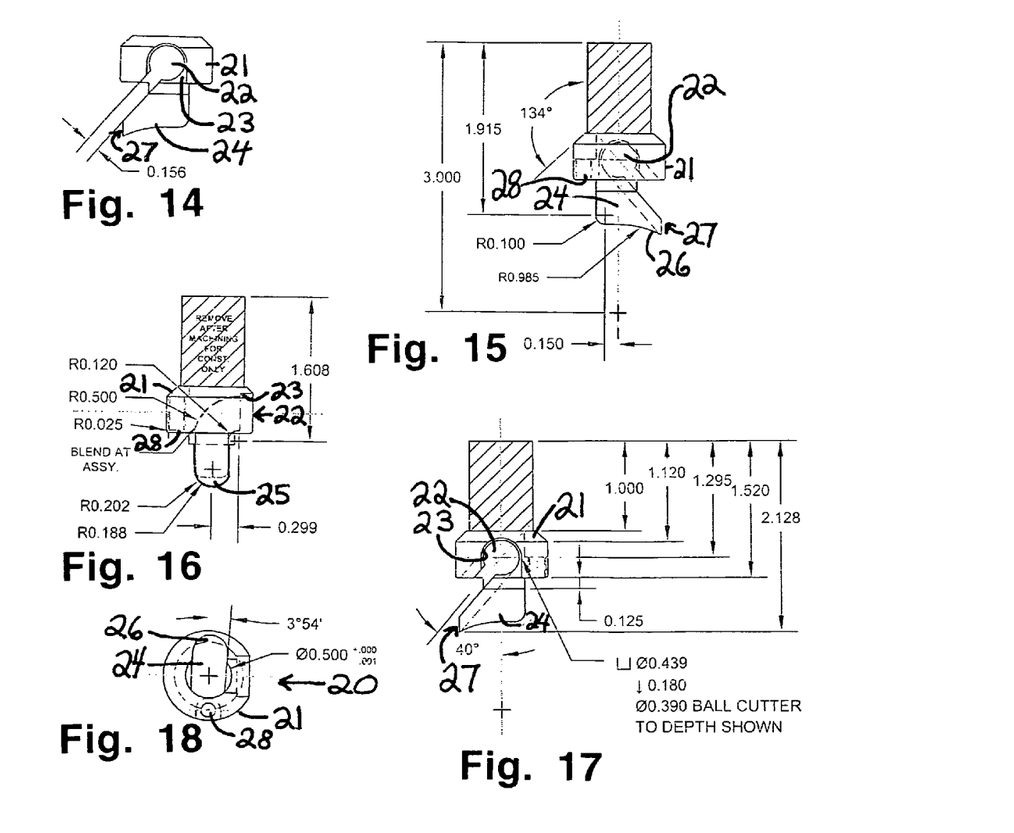
FIG. 14 is an elevational view of the insert of FIG. 12, taken from the opposite side whereof.
FIG. 15 is a side plan view of the insert of FIG. 12, which shows a machining flange that is removed in the finished insert.
FIG. 16 is a side plan view of the insert with machining flange of FIG. 15, taken from a view orthogonal thereto.
FIG. 17 is a side plan view of the insert with machining flange of FIG. 15, taken from the opposite side whereof.
FIG. 18 is a bottom plan view of the insert of FIG. 12.
Figure 19:
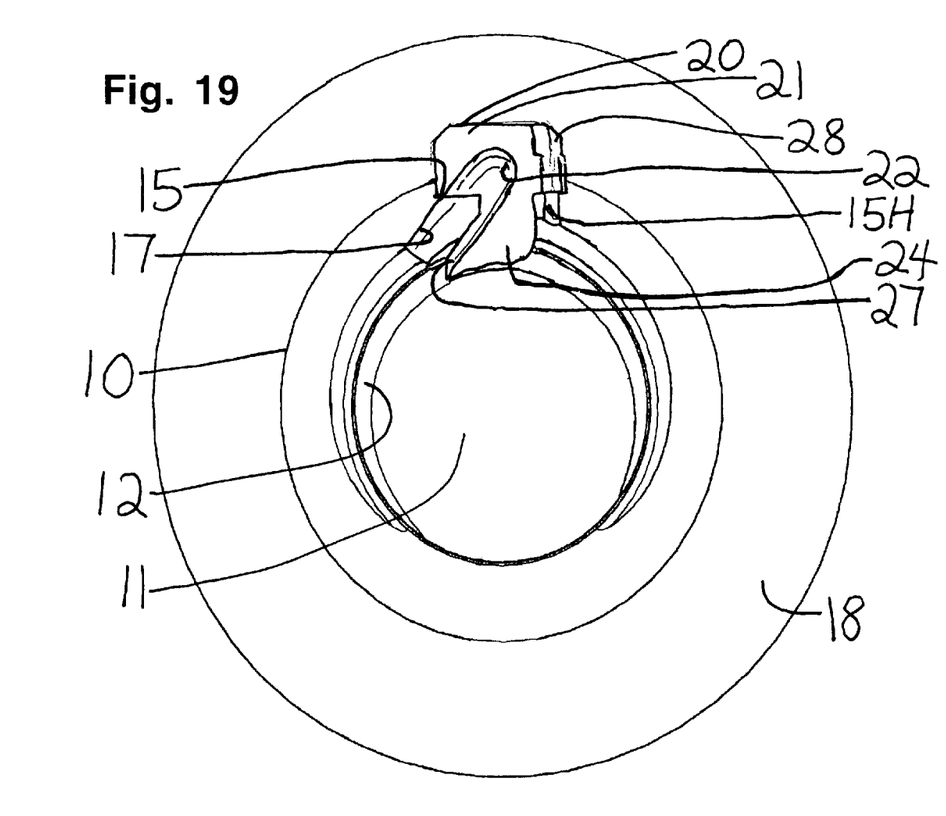
FIG. 19 is a front section view of a ball screw nut embodiment as of FIG. 1, taken through an insert receptacle of the housing and an insert. No ball screw shaft is shown.

Also, formulae for FIG. 5 are A=(LEAD/360)+(LEAD×TPC), and B=(LEAD×(TPC+2))+SHIFT. Some ball nut data for FIGS. 5-8 follow:
DIA. 2.25
LEAD 0.500
HAND RH
START 1
BALL DIA. 0.375
HELIX 3° 54'.
Tolerances, unless otherwise specified, in FIGS. 5-8 follow:
FRACTIONS +/−1/64
TWO-PLACE DECIMAL +/−0.010
THREE-PLACE DECIMAL +/−0.005
FOUR-PLACE DECIMAL +/−0.0005
ANGLES +/−1/2°.
Notes to FIGS. 5-8 follow:
Flange to #.
Break all sharp edges.
All machined surfaces to be concentric, square, parallel or flat within 0.0005 T.I.R.
Keyways to be symmetrical to and within =1-0.001.
All tapped holes G.H. for H.T.
Each of FIGS. 12 and 14 is a finished view. Tolerances, unless otherwise specified, in FIGS. 12-18 follow:
FRACTIONS +/−1/64
TWO-PLACE DECIMAL +/−0.010
THREE-PLACE DECIMAL +/−0.001
FOUR-PLACE DECIMAL +/−0.0005
ANGLES +/−1/16°.
Notes to FIGS. 12-18 follow:
Break all sharp edges.
All machined surfaces to be concentric, square, parallel or flat within 0.0005 T.I.R.
Keyways to be symmetrical to and within =/−0.001.

Figures 20, 21:
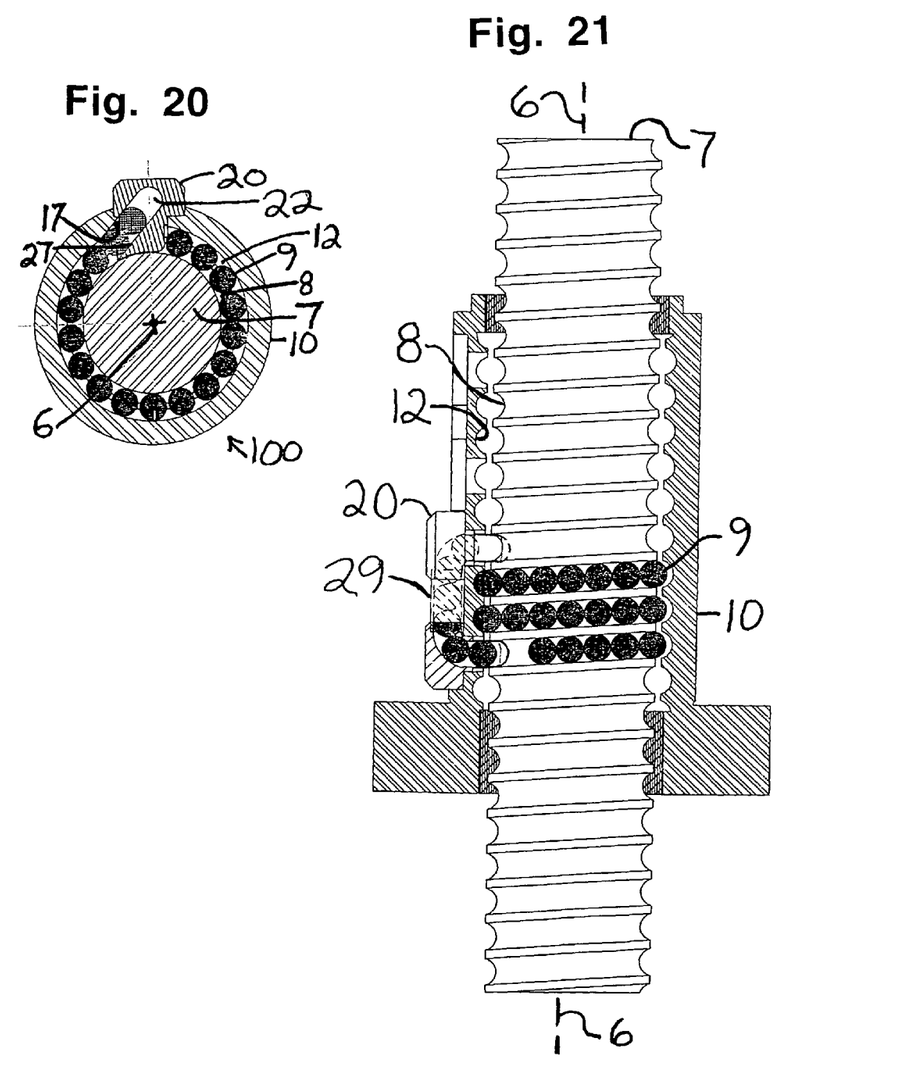
FIG. 20 is a front section view of a ball screw nut embodiment as of FIG. 1, taken through an insert receptacle of the housing and an insert, with a ball screw shaft inserted. Compare, FIG. 19.
FIG. 21 is a side section view of the embodiment of FIG. 20.
Figure 22:
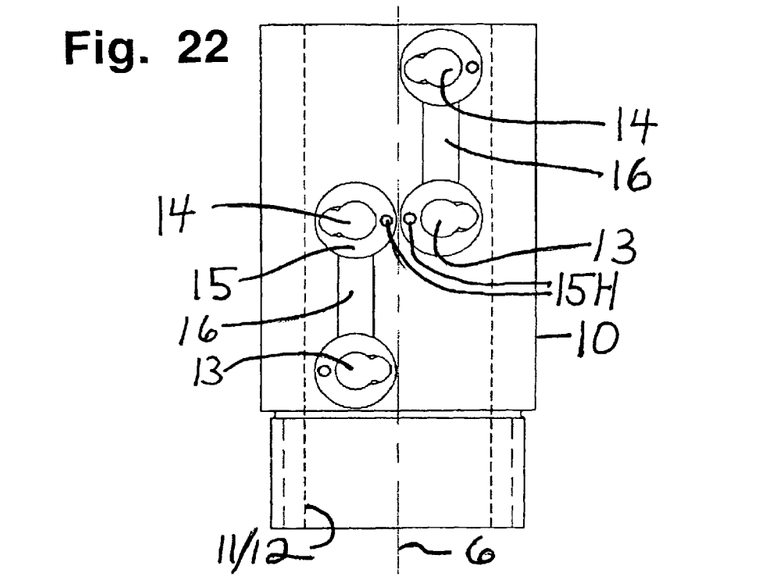
FIG. 22 is a top plan view of a ball screw nut embodiment hereof, which has staggered entry, plural raceways.
Figure 23:
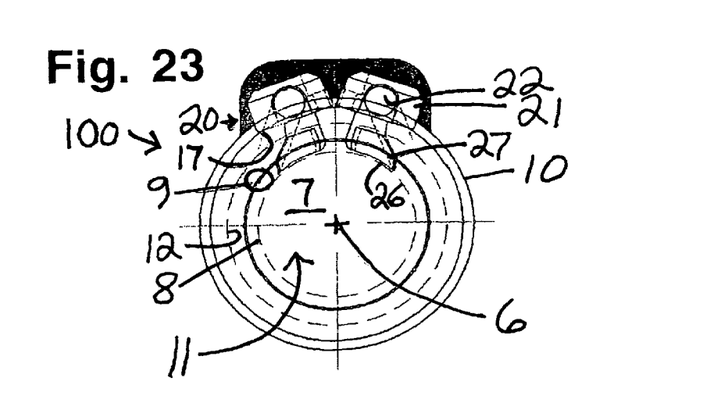
FIG. 23 is a general front plan view of the ball screw nut of FIG. 22, with its inserts and with insert communication relays in place, and combined with a corresponding ball screw shaft.

Some ball screw data for FIGS. 20-21 follow:
DIA. 2.25
LEAD 0.500
HAND RH
START 1
BALL DIA. 0.375
RADIUS (FIN) 0.195
HELIX 3° 54'
ROOT DIA. (FIN) 2.7131.
Tolerances, unless otherwise specified, in FIGS. 20-21 follow:
FRACTIONS +/−1/64
TWO-PLACE DECIMAL +/−0.010
THREE-PLACE DECIMAL +/−0.005
FOUR-PLACE DECIMAL +/−0.0005
ANGLES +/−1/2°.
Notes to FIGS. 20-21 follow:
Flange to #.
Break all sharp edges.
All machined surfaces to be concentric, square, parallel or flat within 0.0005 T.I.R.
Keyways to be symmetrical to and within =/−0.001.
Tolerances, unless otherwise specified, in FIGS. 22-23 follow:
FRACTIONS +/−1/64
TWO-PLACE DECIMAL +/−0.010
THREE-PLACE DECIMAL +/−0.005
FOUR-PLACE DECIMAL +/−0.0005
ANGLES +/−1/2°.
Numerical values may be considered exact or approximate.

CONCLUSION TO THE INVENTION

The present invention is thus provided. Various feature(s), part(s), step(s), subcombination(s) and/or combination(s) may be employed with or without reference to other feature(s), part(s), step(s), subcombination(s) and/or combination(s) in the practice of the invention, and numerous adaptations and modifications can be effected within its spirit, the literal claim scope of which is particularly pointed out as follows:

What is claimed is:

1. An insert for a ball screw nut, which insert comprises a body with a passage for ball bearings, which opens in a first direction; a passage inter-insert communication member resting inner shoulder; a foot depending from and joined to the body, which has a heel portion spaced apart downwardly from the body and a toe portion joined to and laterally extended a substantial distance from the heel portion such that when viewed from a side position the foot depending from and joined to the body is provided in a L-shaped form; and a channel for the ball bearings beginning in the toe, which faces in a second direction substantially perpendicular to the first direction when viewed from a top position, which has a generally upward facing, open ball bearing receiving surface, and which can communicate the ball bearings from initial contact of the ball bearings with the generally upward facing, open ball bearing receiving surface from or to the passage in the body of the insert, to or from at least one internal, spiral raceway in an internal passage of a housing of the ball screw nut, which is adapted to receive and contain the ball bearings in conjunction with an external, spiral raceway of a ball screw shaft when the shaft and the housing are assembled together about a central axis with the internal, spiral raceway in the internal passage of the housing, wherein the channel corresponds with a ball bearing pickup/dropoff upper surface of the nut, which has an angle, when the insert is assembled in the nut, and includes a lower surface substantially parallel with the angle of the pickup upper surface such that an angled pickup or dropoff passage is provided for the ball bearings when the insert is combined with the housing of the nut, and wherein the toe portion is such that the generally upward facing, open ball bearing receiving surface:

provides for initial contact with the ball bearings substantially beneath center of the at least one spiral raceway formed by the nut and the ball screw shaft when the nut and shaft are combined; and faces in a direction having a substantial component parallel with a radius originating from the central axis such that the angle of the ball bearing pickup/dropoff upper surface is not parallel with the radius originating from the central axis to provide part of a passage for the ball bearings.

2. In combination, the insert of claim 1, assembled with the nut, which can receive the ball screw shaft having the external, spiral raceway adapted to receive ball bearings, wherein the housing of the nut has an internal passage along the central axis with the internal, spiral raceway in the internal passage of the housing, wherein each internal spiral raceway has communication to outside the internal passage through the housing with two openings; and one or both of the openings is adapted to receive and accommodate one insert per opening; and wherein the first direction is along a line parallel to the central axis and external the internal passage of the housing when the insert is inserted in the housing.

3. The combination of claim 2, wherein the angle of the ball bearing pickup/dropoff upper surface is about a 40-degree angle with respect to a line parallel, with the radius from the central axis.

4. The combination of claim 3, additionally wherein a collar is present.

5. The combination of claim 2, wherein the two openings are generally in when viewed from the top, and include a surrounding insert seat.

6. The combination of claim 5, wherein the two openings also include a tapped insert securing hole for receiving a securing screw to secure or help secure the insert.

7. The insert of claim 1, wherein the foot has between the heel portion and the toe portion a lower boundary with a radially curved arch.

8. In combination, the insert of claim 7, assembled with the nut, which can receive the ball screw shaft having the external, spiral raceway adapted to receive ball bearings, wherein the housing of the nut has an internal passage along the central axis with the internal, spiral raceway in the internal passage of the housing, wherein each internal spiral raceway has communication to outside the internal passage through the housing with two openings; and one or both of the openings is adapted to receive and accommodate one insert per opening; and wherein the first direction is along a line parallel to the central axis and external the internal passage of the housing when the insert is inserted in the housing.

9. The combination of claim 8, wherein the angle of the ball bearing pickup/dropoff upper surface is about a 40-degree angle with respect to a line parallel with the radius from the central axis.

10. The combination of claim 8, additionally wherein a collar is present.

11. The combination of claim 8, wherein the two openings are generally in a keyhole shape when viewed from the top, and include a surrounding insert seat.

12. The combination of claim 11, wherein the two openings also include a tapped insert securing hole for receiving a securing screw to secure or help secure the insert.

* * * * *